Patented Mar. 26, 1946

2,397,341

UNITED STATES PATENT OFFICE 2,397,341

REACTION OF HYDROGEN CYANIDE WITH CARBOXYLIC ACID ESTERS OF ALPHA, BETA-UNSATURATED ALCOHOLS

Ellsworth Knowlton Ellingboe, Wilmington, Del., assignor to E. I. du Pont de Nemours & Company, Wilmington, Del., a corporation of Delaware No Drawing. Application August 20, 1940, Serial No. 353,417

9 Claims. (Cl. 260—464)

This invention relates to organic chemical processes and more particularly to the reaction of hydrogen cyanide with certain esters to form nitrile esters.

Hydrogen cyanide has been reacted with certain unsaturated compounds, e. g. certain compounds having a carbon-carbon double bond conjugated with the double bond of a carbonyl group or of a carboxyl group, or certain compounds having a triple bond, e. g. acetylene. The yields in the last named reaction are low.

This invention has as an object the provision of a new and simple process whereby hydrogen cyanide may be reacted with the carboxylic acid esters of alpha, beta-unsaturated alcohols. A further object is the provision of a process for the preparation of chemical intermediates for the preparation of alpha, beta-unsaturated nitriles, amine esters, and other valuable products. Other objects will appear hereinafter.

These objects are accomplished by the following invention wherein hydrogen cyanide is reacted with a carboxylic acid ester of an alpha, beta-unsaturated alcohol in the presence of an alkaline catalyst.

The alpha, beta-unsaturated alcohol is one having an ethylenic double bond between the carbon attached to the hydroxyl group and another carbon (see Beilstein, 4th Ed., Vol. 1, p. 271).

The reaction of hydrogen cyanide with the carboxylic acid ester of the alpha, beta-unsaturated alcohol is carried out by mixing the reactants, adding an alkaline catalyst (preferably in finely divided form), and keeping the resultant mixture at 0° to 100° C. under atmospheric or super-atmospheric pressure until the reaction is completed. Although not necessary, it is usually desirable to agitate the reaction mixture to secure good contact between the reactants and the catalyst, and thereby promote smooth reaction. A preferred form of the process of this invention consists in adding the hydrogen cyanide gradually to an agitated mixture of the carboxylic acid ester of an alpha, beta-unsaturated alcohol and an alkaline catalyst. The temperature of the reaction mixture is usually maintained between 0° and 100° C. but this may be varied over a much wider range, depending upon the reactivity of the ester employed and the stability of the reaction product. The product may be isolated from the reaction mixture by distillation, crystallization, extraction, or any of a number of processes well known to the art. Often it is preferable to first remove the alkaline catalyst by washing with water before isolating the product.

The esters employed in this process are preferably freshly distilled and substantially anhydrous. However, small amounts of water, alcohols, aldehydes, and common impurities are not harmful. Appreciable quantities of materials which neutralize the alkaline catalysts employed obviously should be avoided. Hydrogen cyanide of commercial grade is suitable for the process. In general, any compound capable of liberating hydrogen cyanide under the conditions of the process may be employed. Similarly, a variety of alkaline catalysts are useful. The common basic alkali metal compounds, such as sodium and potassium hydroxide and their basic salts, are particularly valuable. Small amounts of aldehydes or ketones appear in certain cases to facilitate reaction and improve the yield. Accordingly, though not essential, it may sometimes be desirable to include a few per cent of material such as acetaldehyde, butyraldehyde, cyclohexanone, and the like in the reaction mixture.

The hydrogen cyanide and the ester usually are employed in approximately equivalent amounts. However, if desired, either may be used in excess, thereby insuring more complete reaction of the other. The amounts of alkaline catalyst employed also are not critical. Only small quantities are required, and in general the amount of alkaline agent falls in the range of 0.001 to 0.1 molar proportion, based on the ester used.

The reaction is conveniently carried out in the liquid phase. In certain cases the addition of an inert solvent may be advantageous to promote ease of reaction and product isolation. However, in other cases, particularly where the reactants and products are all mobile liquids, the use of added solvents is of no benefit. The reaction also may be carried out in the vapor phase, this being accomplished by passing the mixed reactants over an alkaline catalyst in suitable physical form to permit good contact.

The more detailed practice of the invention is illustrated by the following examples, wherein parts given are by weight. There are of course many forms of the invention other than these specific embodiments.

*Example I*

A mixture of 86 parts of vinyl acetate and one (1) part of potassium cyanide is placed in a reaction vessel fitted with mechanical stirrer, reflux condenser, and addition means. The mixture is held at about 50–60° C. and, with stirring, 33 parts of liquid hydrogen cyanide is added during one hour. After this addition, the reaction maintains itself at refluxing temperature for another one-half hour, and is then stirred overnight. The brown reaction mixture is diluted with methylene chloride, poured into water, the layers separated, and the non-aqueous layer filtered. After several washes with water, the methylene chloride solution is dried over calcium sulfate and distilled. A yield of 74 parts (66% conversion) of lactonitrile acetate, B. P. 70–71°/19 mm., is obtained. Ten (10) parts of unreacted vinyl acetate is recovered, and a negligible tarry residue (1–2 parts) remains after the distillation.

Example II

A mixture of 86 parts of vinyl acetate, one (1) part of acetaldehyde, and one (1) part of potassium cyanide is placed in a reaction vessel fitted with mechanical stirrer, reflux condenser, and addition means. The mixture is held at 50–60° C. and, with stirring, 33 parts of liquid hydrogen cyanide is added during one hour. The reaction and isolation of product are carried out as described in Example I. A yield of 88 parts (78% conversion) of lactonitrile acetate, B. P. 64–65°/15 mm., is obtained. Only 1–2 parts of tarry residue remain after the distillation.

Example III

A mixture of 65 parts of vinyl acetate, 26 parts of liquid hydrogen cyanide, and one (1) part of fused sodium acetate is placed in a nickel pressure vessel. The container is sealed, and heated (with agitation) for 24 hours in a bath at 100° C. The pressure vessel is then cooled and opened, and the product isolated in the manner described in Example I. A yield of 54 parts (64%) of lactonitrile acetate, B. P. 87–89°/45 mm., is obtained.

Example IV

Liquid hydrogen cyanide (15 parts) is added to a mixture of 36 parts of vinyl formate and 0.5 part of potassium acetate at room temperature. An exothermic reaction occurs, and the vessel is sealed and allowed to stand at 50° for four days. The product is taken up in 70 parts of ether, washed with water, dried, and distilled. Fourteen (14) parts of lactonitrile formate, B. P. 59–60°/17 mm., and 13.3 parts of a high boiling residue are obtained.

Example V

A mixture of 52 parts of beta-amyl vinyl acetate and one (1) part of potassium cyanide is placed in a reactor fitted with mechanical stirrer, reflux means, and addition means. The reaction mixture is heated to about 50°, and, with stirring, 12 parts of liquid hydrogen cyanide are added during about 1.5 hours. The mixture is then let stand overnight. After six hours of gentle refluxing, an additional 9 parts of hydrogen cyanide are added during two hours, and the reaction again let stand overnight.

After an additional four hours' refluxing with stirring, the dark reaction product is diluted with 1–2 volumes of methylene chloride, filtered, poured into water, the methylene chloride solution separated and again filtered. The solution is then washed well with several portions of water and dried over potassium carbonate. Distillation yields about 4 parts of unreacted beta-amyl vinyl acetate and 41 parts (72% yield) of alpha-acetoxy-octanonitrile, B. P. 97–102°/3′ mm.; analysis: Calc'd for $C_{10}H_{17}O_2N$: N, 7.65. Found: N, 8.02.

Example VI

A mixture of 70 parts of Δ 1-cyclohexenyl acetate, 17 parts of hydrogen cyanide, one (1) part of cyclohexanone, and one (1) part of potassium cyanide is placed in a nickel pressure vessel. The container is sealed and, with agitation, heated for 24 hours in a bath at 100° C. The pressure vessel is cooled and opened, and the black, somewhat tarry mixture worked up in the manner described in earlier examples. Distillation yields 22 parts of unreacted cyclohexenyl acetate, and 21 parts of 1-cyanocyclohexyl acetate, B. P. 100–105°/6 mm., M. P. 48–51° C.

Example VII

A mixture of 49 parts of Δ 1-cyclohexenyl acetate, 14 parts of hydrogen cyanide, and one (1) part of potassium cyanide is placed in a nickel pressure vessel. The reaction and isolation of the product are carried out as described in Example VI. Distillation yields 14 parts of unreacted cyclohexenyl acetate, and 10 parts of 1-cyanocyclohexyl acetate.

The process of the present invention is generic to the reaction of carboxylic acid esters of alpha, beta (ethylenic) unsaturated alcohols with hydrogen cyanide in the presence of an alkaline catalyst. In addition to the esters mentioned in the examples, other carboxylic acid esters of alpha,beta-unsaturated alcohols may be used including the esters of aliphatic monocarboxylic acids, e. g. the formates, acetates, propionates, butyrates, laurates, oleates, and stearates, the esters of aromatic carboxylic acids, e. g. the benzoates, the esters of heterocyclic carboxylic acids, e. g. the furoates, the esters of polycarboxylic acids, e. g. the oxalates, malonates, succinates, and adipates. The esters of fatty acids and particularly of lower (one to four carbon atoms) aliphatic monocarboxylic acids are preferred.

The carboxylic acid ester may be of any alpha, beta ethylenic unsaturated alcohol including vinyl alcohol and its substitution derivatives such as the alpha- or beta-mono-substituted, the alpha,beta- or beta,beta-disubstituted, and the alpha,beta,beta-trisubstituted vinyl alcohols. Thus, the carboxylic acid esters of such alcohols as propen-1-ol, propen-2-ol, 2-methyl-propen-1-ol, and the alpha- and beta-phenyl vinyl alcohols are included.

Liquid or gaseous hydrogen cyanide of commercial quality is generally employed directly for this reaction. However, any material which generates hydrogen cyanide under the conditions of the process may be used.

The alkaline catalysts most beneficial are the alkali metallic hydroxides and their basic salts, including sodium and potassium hydroxides, carbonates, bicarbonates, borates, phosphates, cyanides, acetates, propionates, stearates, tartrates, alkoxides and similar materials. These alkaline catalysts are commonly added in a finely divided solid form; solutions likewise are suitable. In certain cases, other basic materials such as the hydroxides or basic salts of the alkali earth metals may be employed. Any alkaline compound of a metal of the A families of the first and second groups may be used but alkali metal alkaline compounds are preferred.

The reaction may be carried out in the presence or absence of added solvents. Often it is most convenient to simply react the hydrogen cyanide and the ester in the absence of any other solvent, the reactants and their condensation product affording the solvent medium for the reaction. Usually the two reactants are used in equivalent amounts, but either may be used in excess to afford an added solvent medium for the reaction, and to assure complete reaction of the other. Also, the reaction product may be kept at such a concentration as to afford such a solvent medium. For example, in a continuous process, a mixture of equivalent amounts of hydrogen cyanide and the unsaturated ester may be added to an agitated mixture of the catalyst and the preformed reaction product, and the product withdrawn at the bottom of the reactor at the same rate as the reactants are added.

Although not necessary, the presence of an added aldehyde or ketone, preferably that tautomeric with the alcohol of the ester (in addition to any aldehyde or ketone which might be present with the ester under the reaction conditions) in the reaction mixture has been observed in some cases to increase the yield of nitrile esters obtained by this process. For example, a few per cent of acetaldehyde added to the reaction mixture of vinyl acetate and hydrogen cyanide improved by 14 to 32% the yields of lactonitrile acetate obtained. Similarly, the presence of a few per cent of cyclohexanone, improves the yield of 1-cyanocyclohexyl acetate obtained by the reaction of cyclohexenyl acetate and hydrogen cyanide. Any aldehyde or ketone may be used as a promoter for this reaction. Thus, formaldehyde, acetaldehyde, propionaldehyde, butyraldehyde, heptaldehyde, benzaldehyde, acetone, diethyl ketone, cyclohexanone, acetophenone, and many others may be employed. Often an added solvent may be desirable, particularly in those cases where one of the reactants or the product is a solid. Suitable solvents include all materials inert under the conditions of the process and having good solvent action on the product and the reactant ester and hydrogen cyanide. Among these are hydrocarbons, halogenated hydrocarbons, ethers, esters, and numerous other compounds. Solvents for the reactants which are non-solvents for the product may be employed.

The reaction is readily adaptable to any of a variety of processes, and the order of addition of reactants is not critical. The reactants and catalyst may be mixed together and maintained at the desired temperature until reaction is complete, or hydrogen cyanide may be added to an agitated mixture of catalyst and the ester. Conversely, the ester may be added to a hydrogen cyanide-catalyst mixture. A most suitable process involves the addition of the two reactants simultaneously to an agitated mixture of catalyst and solvent or catalyst and preformed product. The reaction also may be carried out in the vapor phase, a gaseous mixture of the ester and hydrogen cyanide being conducted over the basic catalyst maintained at the desired temperature of reaction. The process may be carried to completion by allowing sufficient reaction time, but this is not necessary, and it may at times be desirable to carry the reaction only part way, isolate the product, and recycle the reactants.

A wide range of temperatures is suitable for this process. For practical purposes the preferred temperatures are above the solidification point of the reaction mixture and below the decomposition point of the reactants and products involved. The preferred temperature is obviously dependent also upon the reactivity of the unsaturated ester involved. For example, vinyl acetate is conveniently reacted with hydrogen cyanide at room temperature or slightly above, the reaction proceeding smoothly as the reactants are mixed. On the other hand, cyclohexenyl acetate may require as much as 24 hours at 100° to obtain complete reaction. The preferred temperature of reaction generally lies between 20 and 100° C. Lower temperatures may retard the reaction unduly, while higher temperatures tend toward lower yields and tar formation through side reactions. As illustrated above, the time required is a function of the reactivity of the ester employed and of the temperature at which the reaction is carried out. A compound such as vinyl formate may require less than a minute of contact with the hydrogen cyanide, while cyclohexenyl acetate under the same conditions may require several hours.

The pressure at which the reaction is conducted is not critical, and is dependent upon the other conditions most suitable for the condensation of a given ester with hydrogen cyanide. Often it is desirable to conduct the reaction at atmospheric pressure, with or without reflux, depending upon the nature of the reactants and the temperature employed. However, in other cases, it is best to use a closed pressure system and superatmospheric pressures, thus permitting elevated temperatures and more rapid reaction.

This invention affords a simple practicable method for the preparation of a great variety of nitrile esters. These compounds are useful as intermediates in the synthesis of many valuable materials. For example, lactonitrile acetate obtained by this invention from the condensation of vinyl acetate and hydrogen cyanide may be reduced to beta-acetoxypropylamine; pyrolysis of lactonitrile acetate gives the valuable acrylonitrile in excellent yield.

The above description and examples are intended to be illustrative only. Any modification of or variation therefrom which conforms to the spirit of the invention is intended to be included within the scope of the claims.

What is claimed is:

1. Process of preparing a cyanoester which comprises reacting hydrogen cyanide in the presence of an alkaline catalyst with a carboxylic acid ester of an alpha, beta-unsaturated alcohol.

2. Process of claim 1 wherein the catalyst is a basic compound of an alkali metal.

3. Process of preparing a cyanoester which comprises reacting hydrogen cyanide, in the presence of an alkaline catalyst, with an aliphatic monocarboxylic acid ester of an alpha, beta-unsaturated alcohol.

4. Process of preparing a cyanoester which comprises reacting hydrogen cyanide, in the presence of an alkaline catalyst, with a lower aliphatic monocarboxylic acid ester of an alpha, beta-unsaturated alcohol.

5. Process of preparing a cyanoester which comprises reacting hydrogen cyanide with vinyl acetate in the presence of an alkaline catalyst.

6. Process of preparing a cyano ester which comprises reacting hydrogen cyanide with vinyl acetate in the presence of a basic compound of an alkali metal.

7. The process of producing monocarboxylic acid esters of α-hydroxypropionic acid nitrile which comprises reacting hydrogen cyanide with the vinyl ester of a monocarboxylic acid in the presence of a base and isolating the ester of the nitrile so formed.

8. Process of preparting a cyanoester which comprises reacting hydrogen cyanide in the presence of an inorganic alkaline catalyst with the vinyl ester of an aliphatic monocarboxylic acid.

9. Process of preparing a cyanoester which comprises reacting hydrogen cyanide in the presence of an inorganic alkaline catalyst with the vinyl ester of a lower aliphatic monocarboxylic acid.

ELLSWORTH KNOWLTON ELLINGBOE.